(12) United States Patent
Li et al.

(10) Patent No.: US 8,520,492 B2
(45) Date of Patent: *Aug. 27, 2013

(54) METHOD AND APPARATUS FOR TRANSMITTING SRS IN LTE TDD SYSTEM

(75) Inventors: Yingyang Li, Beijing (CN); Xiaoqiang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 218 days.

This patent is subject to a terminal disclaimer.

(21) Appl. No.: 12/865,334

(22) PCT Filed: Jan. 7, 2009

(86) PCT No.: PCT/KR2009/000050
§ 371 (c)(1),
(2), (4) Date: Jul. 29, 2010

(87) PCT Pub. No.: WO2009/099273
PCT Pub. Date: Aug. 13, 2009

(65) Prior Publication Data
US 2010/0309852 A1    Dec. 9, 2010

(30) Foreign Application Priority Data
Feb. 5, 2008 (CN) .......................... 2008 1 0004863

(51) Int. Cl.
| | | |
|---|---|---|
| H04J 11/00 | (2006.01) | |
| H04J 1/00 | (2006.01) | |
| H04B 7/208 | (2006.01) | |
| H04W 4/00 | (2009.01) | |
| H04L 5/00 | (2006.01) | |
| H04W 84/04 | (2009.01) | |
| H04L 5/02 | (2006.01) | |

(52) U.S. Cl.
CPC ............... *H04L 5/0007* (2013.01); *H04L 5/026* (2013.01); *H04W 84/04* (2013.01)
USPC ........... 370/203; 370/344; 370/480; 370/328; 455/422.1

(58) Field of Classification Search
USPC ....... 370/203, 328, 343, 344, 480; 455/422.1
See application file for complete search history.

(56) References Cited

U.S. PATENT DOCUMENTS

| | | | | |
|---|---|---|---|---|
| 7,957,759 | B2 * | 6/2011 | Papasakellariou | 455/522 |
| 8,014,265 | B2 * | 9/2011 | Sarkar et al. | 370/203 |
| 8,055,301 | B2 * | 11/2011 | Teo et al. | 455/562.1 |
| 2007/0104164 | A1 | 5/2007 | Laroia et al. | |
| 2008/0214198 | A1 * | 9/2008 | Chen et al. | 455/450 |
| 2011/0086644 | A1 * | 4/2011 | Dahlman et al. | 455/450 |
| 2011/0176480 | A1 * | 7/2011 | Dahlman et al. | 370/328 |

FOREIGN PATENT DOCUMENTS
EP 1471666 10/2004

OTHER PUBLICATIONS

PCT/ISA/237 Written Opinion issued in PCT/KR2008/007668 (4pp).

* cited by examiner

*Primary Examiner* — Paul H Masur
(74) *Attorney, Agent, or Firm* — The Farrell Law Firm, P.C.

(57) ABSTRACT

The method for transmitting an uplink SRS by an LTE UE comprising steps of: the UE receiving information N indicating SRS transmission; generating an SRS sequence by the UE; and the UE transmitting the SRS in two OFDM symbol in a half-frame or frame if the information N indicates that a period of SRS transmission is 2 ms. With present invention, a format of SRS in LTE FDD and LTE TDD will be the same. Meanwhile, a problem of supporting 2 ms period in the LTE TDD system is solved.

16 Claims, 6 Drawing Sheets

FIG. 5

| Configuration | transition point period | subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 10ms | D | S | U | U | U | D | S | U | U | D |

501
502
503
504
505
506
507

METHOD AND APPARATUS FOR TRANSMITTING SRS IN LTE TDD SYSTEM

BACKGROUND OF THE INVENTION

1. Field of the Invention

The present invention relates to a communication system, especially to a method for transmitting SRS in an LTE communication system and an apparatus using the same.

2. Description of the Related Art

3GPP (The 3rd Generation Partner Project) standardization organization is working out a next generation of wireless communication standard which is named LTE (Long Term Evolution). In a physical layer interface, the new standard adopts OFDM (Orthogonal Frequency Division Multiplexing) technology, which is different from conventional CDMA (Code Division Multiple Access) technology. OFDMA is used in downlink and SCFDMA (Single Carrier Frequency Division Multiple Access) is used in uplink. The technology used in the new standard is effective to resist multi-path propagation, with the adoption of frequency domain equalization reducing complexity of the conventional time domain equalization, and is more suitable to bandwidth high-speed data transmission.

From a point of view of air-interface, the LTE standard techniques can be divided into two categories: a TDD (Time Division Duplex) system and an FDD (Frequency Division Duplex) system. The LTE system supports variable bandwidths. And typical bandwidths include 1.4 MHz, 3 MHz, 5 MHz, 10 MHz, 15 MHz and 20 MHz, which can meet demands of different scenarios. FIG. 1 illustrates a physical layer frame structure for a LTE FDD system in which a length of radio frame (101) is 10 ms, consisting of ten equally sized radio sub-frames (102) of 1 ms length. Each radio sub-frame consists of two equally sized timeslots (103) of 0.5 ms length.

FIG. 2 illustrates a PHY layer frame structure for LTE TDD system. As shown in FIG. 2, a length of radio frame (201) is 10 ms, consisting of ten equally sized radio sub-frames (204) of length 1 ms. Each five continuous radio sub-frames consists a half-frame (202) of length 5 ms. Different from the LTE-FDD system, a second (211) and seventh (212) radio sub-frame in LTE-TDD radio frame are two special sub-frames. A length of the special sub-frame is 1 ms, consisting of three special slots, indicating DwPTS (205 or 208), GP (206 or 209) and UpPTS (207 or 210) respectively. The lengths of the three special slots are variable and are defined by system, and the total length is 1 ms. The length of UpPTS can be 0, 1 or 2 SCFDMA symbols. If the length of UpPTS is 2, UpPTS is used to transmit the uplink Short RACH or Uplink SRS signal or both the Short RACH and SRS signal. If the length of UpPTS is 1, UpPTS is used to transmit the uplink SRS signal. The other eight sub-frames except the special two are respectively consist of two slots (203) of length 0.5 ms.

In the LTE system, according to network scheduling, UE (User Equipment) sends an SRS (Sounding Reference Signal) to eNodeB (evolved NodeB). The SRS signal is used to: according to an analysis result of the SRS signal, eNodeB estimates a quality of channel which is used for transmitting SRS from UE to eNodeB and scheduling data according to frequency selective characteristics; eNodeB performs timing tracking for UE by analyzing the SRS signal and performs a close-loop power control. According to a current standardizing process, main conclusions for SRS transmission in LTE FDD system include: eNodeB broadcasts the SRS in a designated cell as needed and SRS is transmitted in some sub-frame in a designated cell periodically. A period is selected from {2, 5, 10, 20, 40, 80, 160, 320} ms. After UE receives the SRS in the designated cell, the ODFM symbol resource occupied by the SRS is not used when transmitting uplink data. In order to perform the transmission of SRS, UE should receive a user-designated SRS signal transmitted from the network. The signal informs the user of the OFDM symbol resource used to transmit SRS. Currently, there is no description for transmitting the SRS of designated UE in a PHY layer specification which is accomplished in LTE.

Nowadays, a basic idea in the standard for the user-designated SRS signaling is that the signaling includes three parts: Duration, Period and Offset to in which, the duration can use 1 bit to indicate that just one snapshot or infinite. The period value is selected from {2, 5, 10, 20, 40, 80, 160, 320} ms. In LTE FDD, the offset is a time between twice transmission time of each OFDM symbol of SRS from the beginning of the SRS period, and the basic unit is 1 ms. In LTE TDD, definition of offset is different from that in LTE FDD. Since in LTE TDD, SRS can be transmitted in UpPTS or the other uplink sub-frame, the uplink sub-frame may be discontinuous and UpPTS occupy two OFDM symbols at most, the offset is defined as an interval between an OFDM symbol position used to transmit SRS and an OFDM symbol position used to transmit SRS until the period of SRS transmission starts. For example, if the SRS symbol position at the period beginning is defined as 0, a symbol position used to transmit SRS is 3 means that the interval between the two symbols is 3, there is at most 2 OFDM symbol positions can be used to transmit SRS.

The manner of transmitting SRS in LTE TDD is mainly the same as that in LTE FDD. However the system structure of LTE TDD is different from of that in LTE FDD. Difference is that in LTE TDD, a half-frame of length 5 ms has both uplink sub-frame and downlink sub-frame, a number of uplink sub-frames and downlink sub-frames is configured by the network. In some configuration, a half-frame of length 5 ms at least has one uplink sub-frame (exclude UpPTS). According to a principle that only one SRS is transmitted in one uplink sub-frame, there is only one SRS transmission in every 5 ms, and the system can't achieve the SRS transmission with a 2 ms period. Therefore, the performance of SRS transmission by UE is deteriorated in a fast Time-varying channel.

Based on the difference between the LTE TDD and LTE FDD, the current configuration of the 2 ms transmission period for SRS in the LTE FDD can't be used in the LTE TDD system.

The invention proposed a method for transmitting SRS in LTE TDD system and an apparatus using the same. With present invention, a format of SRS in LTE FDD and LTE TDD will be the same. Meanwhile, a problem of supporting 2 ms period in the LTE TDD system is solved.

SUMMARY OF THE INVENTION

The object of this invention is to provide a method for transmitting a SRS in an LTE TDD communication system.

According to one aspect of present invention, a method for transmitting uplink SRS information by an LTE UE comprising steps of:

a) the UE receiving information N indicating SRS transmission;

b) generating an SRS sequence by the UE;

c) the UE transmitting the SRS in two OFDM symbols in a half-frame or a frame if the information N indicates that a period for transmitting SRS is 2 ms.

According to another aspect of present invention, a method for transmitting uplink SRS information by an LTE UE comprising steps of:

a) the UE receiving information N indicating SRS transmission;

b) generating a SRS sequence by the UE; and c) transmitting the SRS with occupying one OFDM symbol or two OFDM symbols in a period based on the information N.

BRIEF DESCRIPTION OF THE DRAWINGS

FIG. 5 is a schematic diagram illustrating seven types of uplink and downlink configuration in an LTE TDD system;

DETAILED DESCRIPTION OF THE PREFERRED EMBODIMENTS

Figure 1:
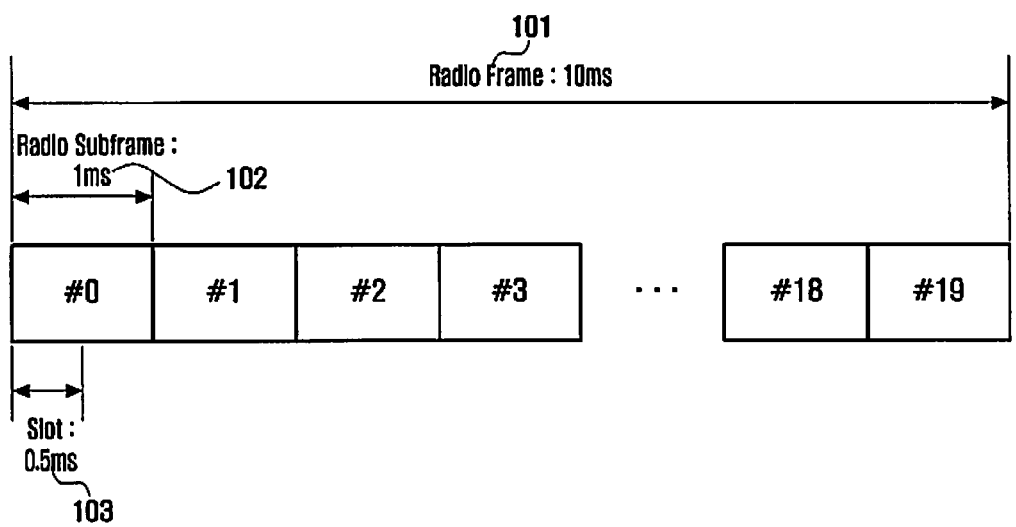
FIG. 1 is a schematic diagram illustrating a frame structure in an LTE FDD system.
Figure 2:
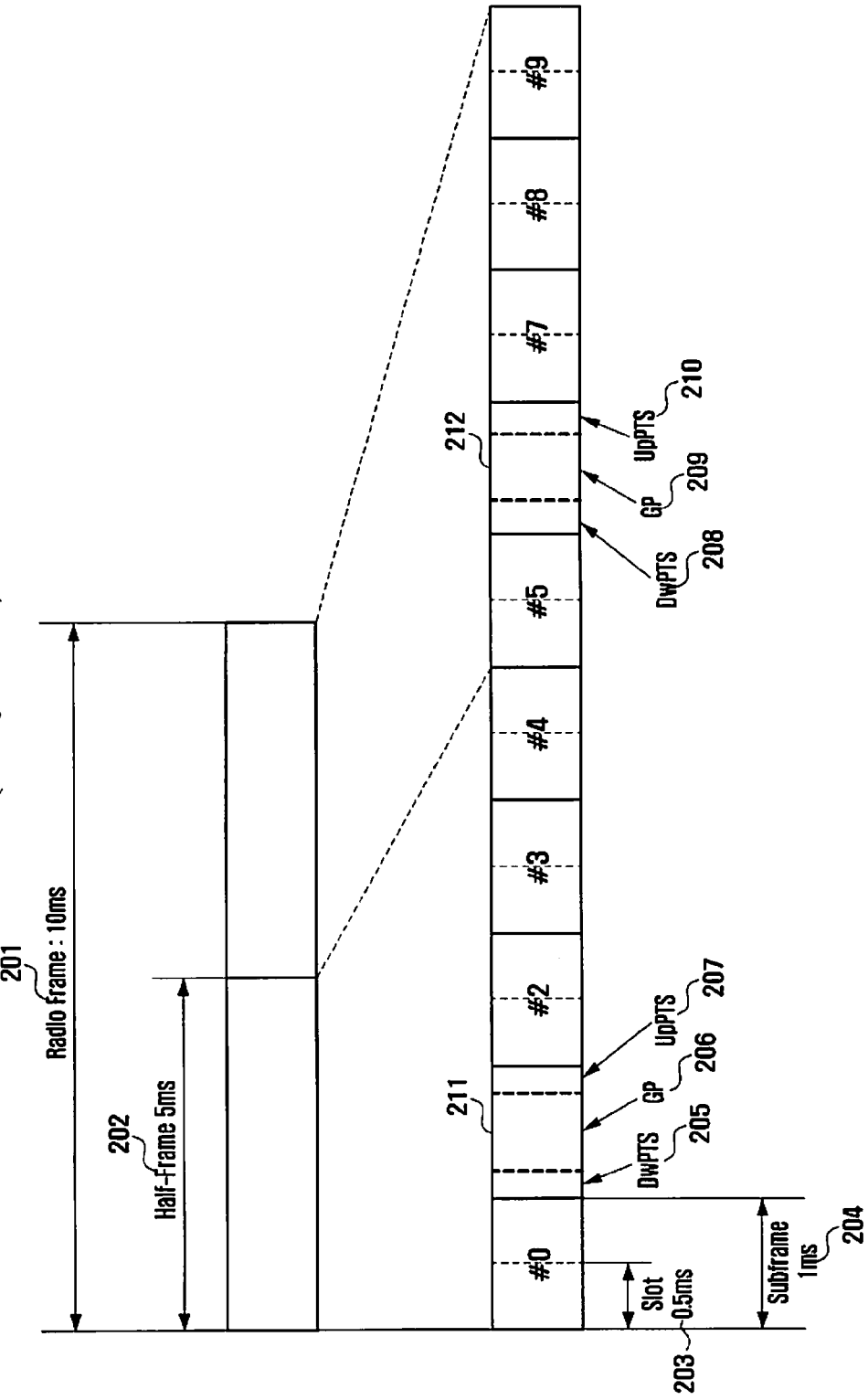
FIG. 2 is a schematic diagram illustrating a frame structure in an LTE TDD system.

For the LTE FDD system, since the maximum period of SRS is among {2, 5, 10, 20, 40, 80, 160, 320} ms, in order to achieve a maximum flexibility, for an arbitrary period, a possible SRS offset is select from {0, 1, . . . , Period−1}. Therefore, for the LTE FDD, the SRS of the designated user includes 2+5+10+20+40+80+160+320=637 indexes. This method provides a maximum flexibility, and needs 10 bits to present 637 indexes. Since 1024 pieces of information may be indicated by 10 bits, the other 1024−637=387 indexes are reserved for various purpose.

When the period is 320 ms, providing at most 320 offsets is unnecessary, the 10 bits may be not the most reasonable. In this condition, the number of indexes can decrease with the decrease of the offset range, so that a total number of bits needed decreases and the number of reserved indexes decreases.

UE receives an index N indicating a period of SRS transmission from base station For a LTE TDD system, the period value of SRS is also among (2, 5, 10, 20, 40, 80, 160, 320} ms, the design of offset is the same as in LTE FDD except that when the period is 2 ms and 5 ms. However compared with LTE FDD the difference is that in LTE TDD, the uplink sub-frame isn't always continuous, so that there doesn't have a complete period of 2 ms. For this reason, the period of 2 ms for LTE should have some special design. Currently, there are seven uplink and downlink configurations supported in LTE TDD, illustrated in FIG. 5(501-507). A group of corresponding SRS indexes is defined to indicate the SRS index of designated user of 2 ms period. For configuration of 0(501), 1(502), 2(503) and 6(507), all of the indexes indicate that in a 5 ms half-frame period or 5 ms frame period, two continuous or arbitrary OFDM positions in logical from the OFDM symbols which are configured to transmit SRS are selected, and the designated user is indicated to use this position to transmit SRS. For configuration of 3(504), 4(505) and 5(506), all of the indexes indicate that in a 10 ms frame period, two continuous or arbitrary OFDM positions in logical from the OFDM symbols which are configured to transmit SRS are selected, and the designated user is indicated to use this position to transmit SRS. The definition mentioned is used to inform the designated user that how to select the OFDM position used for SRS transmission in the 2 ms period.

Considering that in LTE TDD system, there are at most 5 OFDM symbols used to transmit SRS in 5 ms half-frame, which include two symbols in UpPTS, and three OFDM symbols in uplink sub-frame 2, 3 and 4. Thus, if the two selected symbols are arbitrary, the number of choice is C(5, 2)=10 (C presents for combination) with 10 corresponding indexes. Ten indexes need to correspond with the concrete OFDM symbols. Any correspondence will be used without departing from the spirit and scope of the present invention. For example the correspondence may be selected randomly, or when making correspondence, assigning the indexes with high priority to a former or latter position. One consideration about priority is considering a situation with 1 or 2 UpPTS symbol first. There are four situations (a last OFDM symbol and a first OFDM symbol isn't logically continuous) or five situations (a last OFDM symbol and a first OFDM symbol is logically continuous) if select two continuous OFDM symbols, so that four or five indexes are needed for indicating.

If the period is 5 ms, a special case in LTE TDD is that, for configuration 3(504), 4(505) and 5(506), there is no uplink resource in the second half-frame in 10 ms frame. So that SRS can't be transmitted in the second half-frame. If the two continuous or arbitrary OFDM positions in logical are selected from the OFDM symbols configured to transmit SRS in the first half-frame, the definition is the same as in LTE TDD with 2 ms period. Therefore, in order to simplify the system design, 5 ms period isn't suitable for configuration 3, 4 and 5 in LTE TDD in present invention.

Compared with LTE FDD, in some situation, period of 2 ms and 5 ms aren't supported, so that the period of 2 ms and 5 ms is redefined to achieve a similar function as in LTE FDD.

Based on the redefined method to redefine the 2 ms period of configuration 0 to 2 and 6, an actual period is 5 ms, that is, two SRS symbols are occupied every 5 ms. In order to redefine the 2 ms period of configuration 3 to 5, the actual period is 10 ms, that is, two SRS symbols are occupied every 10 ms. In fact, the redefinition described above for 2 ms and 5 ms period for LTE TDD can be used in system configuration and makes the comparison with LTE FDD easy. Sometimes, the system doesn't support the period of 2 ms and 5 ms, and directly define to configure two SRS in 5 ms or 10 ms. The essence of these two methods is the same. The essence of the method is the same as the redefinition of period. More specifically for the second method, SRS period of 2 ms isn't supported in LTE TDD. For configuration 3 to 5, SRS period of 5 ms isn't supported. However, two SRS symbols can be configured every half-frame (every 5 ms), such as for configuration 0 to 2 and 6. Also, two SRS symbols can be configured in the first half-frame (every 10 ms) in radio frame, such as for configuration 3 to 5. The configuration of two SRS symbols in every half-frame can use a similar method compared with the method used in the redefinition of 2 ms and 5 ms period described above, so to speak, a completely flexible configuration needs to indicate C(5,2)=10 choices, or decrease the number of selection by restrict the method of configuration, the invention is not limited.

Furthermore, the redefinition of 2 ms period described above is to configure two SRS symbols in a half-frame (5 ms), that is, it is reasonable to define that 2 ms period isn't support in LTE TDD system and two SRS symbols is configured every half-frame (5 ms). For configuration 0 to 2 and 6, the actual period is 5 ms, that's to say that, two SRS symbols are occupied every 5 ms. For configuration 3 to 5, the actual period is 10 ms, that's to say that, two SRS symbols are occupied every 10 ms. The configuration of two SRS symbols in every half-frame can use a similar method compared with the method used in the redefinition of 2 ms and 5 ms period described above, that is, a flexible configuration needs to indicate C(5,2)=10 choices, or decrease the number of selection by limiting the method of configuration, the invention is not limited.

After the UE receives information N indicating SRS transmission from the network, when the SRS period indicated by N is less than or equal to the number of OFDM symbols configured to transmit SRS in the entire cell in a period, the offset can be calculated as follows:

If the range of N is from 0 to 320/f−1, the period indicated by N is 320 ms, then the SRS is transmitted by using offset N*f.

If the range of N is from 320/f to 320/f+160/m−1, the period indicated by N is 160 ms, then the SRS is transmitted by using offset N−320/f*m.

If the range of N is from 320/f+160/m to 320/f+160/m+80/t−1, the period indicated by N is 80 ms, then the SRS is transmitted by using offset N−320/f−160/m*t.

If the range of N is from 320/f+160/m+80/t to 320/f+160/m+80/t+40/n−1, the period indicated by N is 40 ms, then the SRS is transmitted by using offset N−320/f−160/m−80/t*n.

If the range of N is from 320/f+160/m+80/t+40/n to 320/f+160/m+80/t+40/n+20/p−1, the period indicated by N is 20 ms, then the SRS is transmitted by using offset N−320/f−160/m−80/t−40/n*p.

If the range of N is from 320/f+160/m+80/t+40/n+20/p to 320/f+160/m+80/t+40/n+20/p+10/x−1, the period indicated by N is 10 ms, then the SRS is transmitted by using offset N−320/f−160/m−80/t−40/n−20/p*x.

If the range of N is from 320/f+160/m+80/t+40/n+20/p+10/x to 320/f+160/m+80/t+40/n+20/p+10/x+5−1, the period indicated by N is 10 ms, then the SRS is transmitted by using offset N−320/f−160/m−80/t−40/n−20/p−10/x.

Where f, m, t, n can be 1, 2, 4, 8; p can be 1, 2, 4, 5, 10; x can be 1, 2, 5; M presents, a number of OFDM symbol configured to transmit SRS in a period in the whole cell indicated by information N. The value of f, m, t, n and M need to be set statically in system specification. "−" is a symbol for subtraction.

After UE receives the information N indicating the SRS transmission from network, when the SRS period indicated by N is greater than the number of OFDM symbols configured to transmit SRS in the entire cell in a period, the offset can be calculated as follows:

If the range of N is from 0 to M−1, the period indicated by N is 320 ms, then the SRS is transmitted by using offset N;
Reserved by the system if the range of N is from M to 320/f−1,
If the range of N is from 320/f to 320/f+M−1, the period indicated by N is 160 ms, then the SRS is transmitted by using offset N−320/f;
Reserved by the system if the range of N is from M to 320/f+160/m−1;
If the range of N is from 320/f+160/m to M−1, the period indicated by N is 80 ms, then the SRS is transmitted by using offset N−320/f−160/m;
Reserved by the system if the range of N is from M to 320/f+160/m+80/t−1;
If the range of N is from 320/f+160/m+80/t to M−1, the period indicated by N is 40 ms, then the SRS is transmitted by using offset N−320/f−160/m−80/t;
Reserved by the system if the range of N is from M to 320/f+160/m+80/t+40/n−1;

If the range of N is from 320/f+160/m+80/t+40/n to M−1, the period indicated by N is 20 ms, then the SRS is transmitted by using offset N−320/f−160/m−80/t−40/n;
Reserved by the system if the range of N is from M to 320/f+160/m+80/t+40/n+20/p−1;
If the range of N is from 320/f+160/m+80/t+40/n+20/p to M−1, the period indicated by N is 10 ms, then the SRS is transmitted by using offset N−320/f−160/m−80/t−40/n−20/p;
Reserved by the system if the range of N is from M to 320/f+160/m+80/t+40/n+20/p+10/x−1;
If the range of N is from 320/f+160/m+80/t+40/n+20/p+10/x to M−1, the period indicated by N is 5 ms, then the SRS is transmitted by using offset N−320/f−160/m−80/t−40/n−20/p−10/x;
Reserved if the range of N is from M to 320/f+160/m+80/t+40/n+20/p+10/x+5−1.

Where f, m, t, n can be 1, 2, 4, 8; p can be 1, 2, 4, 5, 10; x can be 1, 2, 5; M presents the number of OFDM symbol configured to transmit SRS in a period in the whole cell indicated by the information N. The value of f, m, t, n and M need to be set statically in system specification. "−" is a symbol for subtraction.

The design method described above is the most basic SRS design for the designated user. The invention considers the coherence of signal format in LTE FDD and LTE TDD, the detailed principle is as follows: firstly, the information bits indicating the SRS transmission of designated user in LTE FDD and LTE TDD is the same. For example, 10 bits or 9 bits are used to inform. Next, the reserved index occupies and only occupies one section of continuous indexes both in LTE FDD and LTE TDD.

According to the design principle of LTE TDD compatible with of LTE FDD, the SRS transmission signal for designated user can refer to a table below:

TABLE 1

Indexes of SRS signal

| index | period | offset | description |
|-------|--------|--------|-------------|
| 0-4 | 5 | 0-4 | Configuration 3, 4 and 5 are reserved in LTE TDD |
| 5-14 | 10 | 0-9 | |
| 15-34 | 20 | 0-19 | |
| 35-74 | 40 | 0-39 | |
| 75-154 | 80 | 0-79 | |
| 155-314 | 160 | 0-159 | |
| 315-634 | 320 | 0-319 | |
| 635-1023 | 2 | 0-1 in FDD 0-9 for TDD | indexes 637-1023 are reserved in LTE FDD indexes 645-1023 are reserved in LTE TDD The offset in LTE TDD is the index of method, using which to select two SRS symbols from half-frame |

Follow table is used to describe by using the same design principle:

TABLE 2

Indexes of SRS signal

| Index | Period | Offset | Description |
|-------|--------|--------|-------------|
| 0-319 | 320 | 0-319 | |
| 320-479 | 160 | 0-159 | |
| 480-559 | 80 | 0-79 | |

TABLE 2-continued

Indexes of SRS signal

| Index | Period | Offset | Description |
|---|---|---|---|
| 560-599 | 40 | 0-39 | |
| 600-619 | 20 | 0-19 | |
| 620-629 | 10 | 0-9 | |
| 630-634 | 5 | 0-4 | Configuration 3, 4 and 5 are reserved in LTE TDD |
| 635-1023 | 2 | 0-1 in FDD 0-9 for TDD | indexes 637-1023 are reserved in LTE FDD indexes 645-1023 are reserved in LTE TDD The offset in LTE TDD is the index of method, using which to select two SRS symbols from half-frame |

Considering the period value could be ordered from small to large, a table uniformly describing the indexes of SRS signal for LTE TDD and LTE FDD could be obtained:

TABLE 3

Indexes of SRS signal

| Index | Period | Offset | Description |
|---|---|---|---|
| 0-9 | 2 | 0-1: LTE FDD 0-9: LTE FDD | 2-9 reserved in LTE FDD The offset in LTE TDD is the index of method, using which to select two SRS symbols from half-frame |
| 10-14 | 5 | 0-4 | Configuration 3, 4 and 5 are reserved in LTE TDD |
| 15-24 | 10 | 0-9 | |
| 25-44 | 20 | 0-19 | |
| 45-84 | 40 | 0-39 | |
| 85-164 | 80 | 0-79 | |
| 165-324 | 160 | 0-159 | |
| 325-1023 | 320 | 0-1 in FDD 0-9 for TDD | indexes 645-1023 are reserved in LTE TDD |

In order to ensure a coherence of design for LTE FDD and LTE TDD, a degree of flexibility may be sacrificed in LTE TDD. If period is 2 ms, the number of indexes is limited to 2 in LTE TDD, so that the number of indexes in LTE FDD and LTE TDD is exactly the same. This is shown in Table 4:

TABLE 4

Indexes of SRS signal

| Index | Period | Offset | Description |
|---|---|---|---|
| 0-1 | 2 | 0-1 | |
| 2-6 | 5 | 0-4 | Configuration 3, 4 and 5 are reserved in LTE TDD |
| 7-16 | 10 | 0-9 | |
| 17-36 | 20 | 0-19 | |
| 37-76 | 40 | 0-39 | |
| 77-156 | 80 | 0-79 | |
| 157-316 | 160 | 0-159 | |
| 317-1023 | 320 | 0-1 in FDD 0-9 for TDD | indexes 637-1023 are reserved |

In the above method, considering the coherence for LTE FDD and LTE TDD, the configuration in both systems should keep the same. The detailed method for LTE TDD is optimized. If using different table for LTE FDD and LTE TDD is allowed, table 1 to 4 could just used in LTE TDD, and another design for LTE FDD is achievable. The mainly difference is that in LTE FDD, only two indexes are occupied in 2 ms period.

The above description is the SRS configuration method based on the redefinition of 2 ms and 5 ms period in LTE TDD. For redefinition of the 2 ms period of configuration 0 to 2 and 6, the actual period is 5 ms. For redefinition of the 2 ms period of configuration 3 to 5, the actually period is 10 ms. So that when using the period value of SRS for calculation, for the 2 ms period of configuration 0 to 2 and 6, 5 ms is used as the period, and for the 2 ms period of configuration 3 to 5, 10 ms is used as the period.

If the redefinition of 2 ms and 5 ms period in LTE TDD is not used, in some situation without supporting 2 ms and 5 ms period, the system defines that two SRS is configured in 5 ms or 10 ms. When using the period of SRS, the value of period is used to calculate directly. Table 5 and table 6 are two possible detailed configuration methods. The period value in table 5 or table 6 is an actual period value. It is assumed that all of C (5,2)=10 methods of selecting two SRS symbols in half-frame are supported.

In table 5, when the index is between 0 and 9, two SRS are configured in a period of 5 ms. The corresponding offset 0 to 9 is the indexes for the methods for selecting two SRS symbols from half-frame substantially. When the index is between 10 and 14, one SRS is configured in a period of 5 ms, and the offset presents a position of assigned SRS. When the index is between 15 and 24, two SRS are configured in a period of 10 ms. The corresponding offset 0 to 9 is the index for the methods for selecting two SRS symbols from half-frame substantially. When the index is between 25 and 34, one SRS is configured in a period of 10 ms, and the offset presents the position of assigned SRS.

TABLE 5

Indexes of SRS signal

| Index | Period | Offset | Description |
|---|---|---|---|
| 0-9 | 5 | 0-9 | The offset is the index of method, using which to select two SRS symbols from half-frame |
| 10-14 | 5 | 0-4 | |
| 15~24 | 10 | 0~9 | The offset is the index of method, using which to select two SRS symbols from half frame |
| 25-34 | 10 | 0-9 | |
| 35-54 | 20 | 0-19 | |
| 55-94 | 40 | 0-39 | |
| 95-174 | 80 | 0-79 | |
| 175-334 | 160 | 0-159 | |
| 335-654 | 320 | 0-319 | |
| 655-1023 | | | Reserved |

Table 6 has the same effect as that of Table 5 except for an order of rows to implement a new embodiment. The invention is limited to the order of SRS period in the table.

In table 6, when the index is between 0 and 9, two SRS are configured in a period of 5 ms. The corresponding offset 0 to 9 is the index of the methods, for selecting two SRS symbols from half-frame substantially. When the index is between 10 and 19, two SRS are configured in a period of 10 ms. The corresponding offset 0 to 9 is the index of the methods for selecting two SRS symbols from half-frame substantially. When the index is between 20 and 24, one SRS is configured in a period of 5 ms, and the offset presents the position of assigned SRS. When the index is between 25 and 34, one SRS is configured in a period of 10 ms, and the offset value presents the position of assigned SRS.

TABLE 6

Indexes of SRS signal

| Index | Period | Offset | Description |
|---|---|---|---|
| 0-9 | 5 | 0-9 | The offset is the index of method, using which to select two SRS symbols from half frame |
| 10-19 | 10 | 0-9 | The offset is the index of method, using which to select two SRS symbols from half-frame |
| 20~24 | 5 | 0~4 | |
| 25-34 | 10 | 0-9 | |
| 35-54 | 20 | 0-19 | |
| 55-94 | 40 | 0-39 | |
| 95-174 | 80 | 0-79 | |
| 175-334 | 160 | 0-159 | |
| 335-654 | 320 | 0-319 | |
| 655-1023 | | | Reserved |

If the redefinition of 2 ms and 5 ms period in LTE TDD is not used, the period of 2 ms not supported in LTE TDD is defined and two SRS are configured every half-frame (5 ms). So that, when using the period value of SRS for calculating, for configuration 0 to 2 and 6, 5 ms is used as the period, for configuration 3 to 5, 10 ms is used as the period. Table 6 is a possible configuration method. It is assumed that all the C(5, 2)=10 methods used to select two SRS symbols in half-frame are supported.

In table 7, when the index is between 0 and 9, two SRS are configured in a period of 5 ms. The corresponding offset 0 to 9 is the index of the methods for selecting two SRS symbols from half-frame. When the index is between 10 and 14, one SRS is configured in a period of 5 ms, and the offset indicates the position of the assigned SRS. When the index is between 15 and 24, one SRS is configured in a period of 10 ms, and the offset presents the position of assigned SRS.

TABLE 7

Indexes of SRS signal

| Index | Period | Offset | Description |
|---|---|---|---|
| 0-9 | 5 | 0-9 | The offset is the index of method, using which to select two SRS symbols from half-frame |
| 10-14 | 5 | 0-4 | |
| 15-24 | 10 | 0-9 | |
| 25-44 | 20 | 0-19 | |
| 45-84 | 40 | 0-39 | |
| 85-164 | 80 | 0-79 | |
| 165-324 | 160 | 0-159 | |
| 325-644 | 320 | 0-319 | |
| 645-1023 | | | Reserved |

C(5,2)=10 indexes are used to achieve complete flexibility for transmitting two SRS in a period. A mapping method from the indexes to two selected SRS symbol is as follows: when UpPTS includes two SRS symbols, a first SRS symbol is indicated by SRS sub-frame offset 0 and a second SRS symbol is indicated by SRS sub-frame offset 1. When UpPTS includes one SRS symbol, the SRS symbol is indicated by SRS sub-frame offset 1. The SRS symbol in the other sub-frame is indicted by the corresponding offset (that is, 2, 3 or 4). Therefore, a possible mapping method from C(5,2)=10 indexes to two selected SRS symbols is shown as follows:

TABLE 8

Mapping from 10 indexes to two selected SRS symbols

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4 |

The network uses RRC signal to transmit the SRS signal generated in step 1.

The generated SRS information is mapped to transmission channel and physical channel, then transmitted to UE through the antenna after being processed accordingly.

Figure 3:
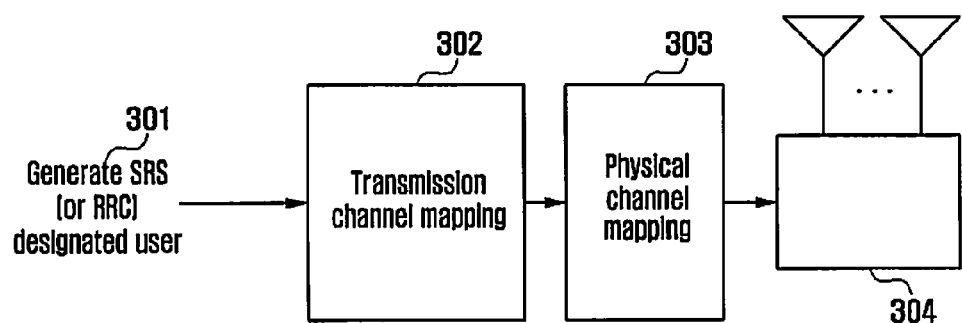
FIG. 3 is a schematic diagram illustrating the SRS transmission process of designated user in an LTE system.

An apparatus for transmitting SRS of designated user is illustrated in FIG. 3. The apparatus includes a SRS generator module (301) for generating the SRS information. The SRS information is mapped to a transmission channel module (302), passed to a physical channel mapping module (303), and the SRS of designated user is transmitted through the antenna (304).

Figure 4:
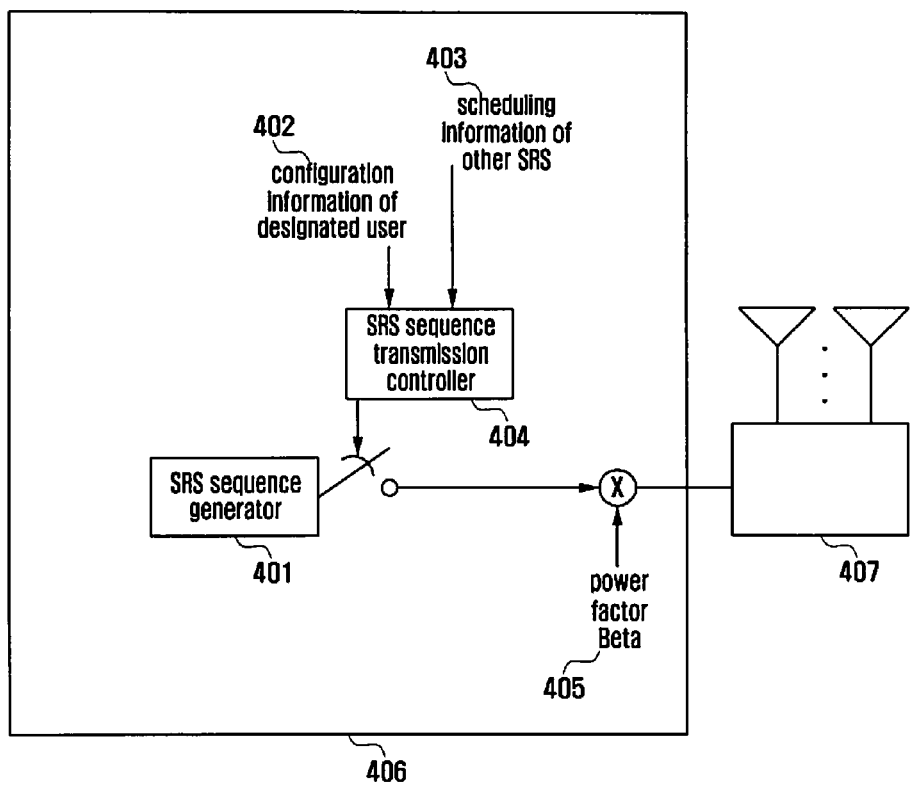
FIG. 4 is a schematic diagram illustrating an SRS transmission process of LTE UE.
Figure 6:
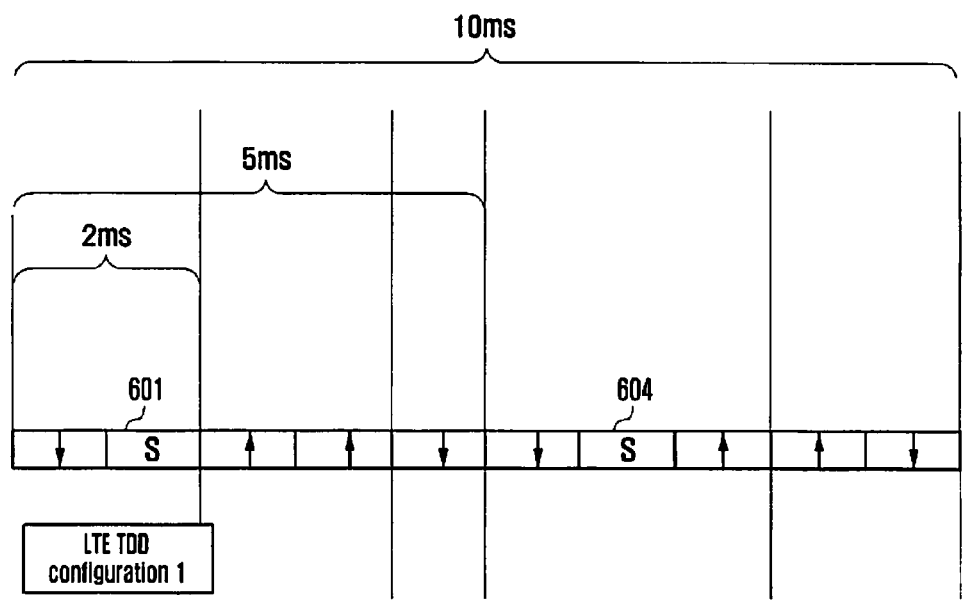
FIG. 6 illustrates an example 1 according to present invention.
Figure 7:
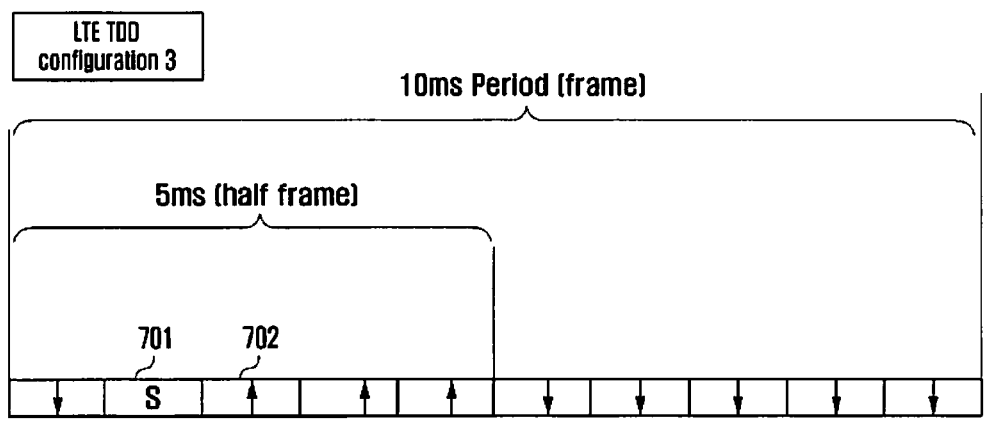
FIG. 7 illustrates an example 2 according to present invention.

The apparatus (406) for transmitting the SRS in LTE UE is illustrated in FIG. 4. The apparatus (406) includes a module (401) which generates an SRS sequence based on the SRS information of designated user received by a module (402) and the other information (such as the cycle offset used to transmit SRS, comb, the bandwidth and so on) received by a module (403). Under the control of a module (404), the power is adjusted by a module (405) in the physical resource allocated at a proper timing and the SRS of designated user is transmitted by using an antenna module (407).

Two examples according to present invention are described as follows. In order to avoid making the description ambiguous, detailed descriptions for known functions are omitted.

A First Example

Configuration 1(502) in LTE TDD is applied in this example.

The signal information indicating the SRS transmission of designated user is generated by the LTE network. According to the table 1, the index 635 is selected. For LTE TDD, the index means the period is 2 ms, indicating that the designated user transmits SRS in the first and second symbol in UpPTS (601 or 604). For LTE FDD, the index means that the designated user may use the available OFDM symbol in the first sub-frame in the 2 ms frame to transmit SRS. Then, via the transmission channel mapping and physical channel mapping, the system transmits the index information to the designated user.

A Second Example

Configuration 3(504) in LTE TDD is applied in this example.

The signal information indicating the SRS transmission of designated user is generated by the LTE network. According to the table 1, the index 637 which indicates that the period is 2 ms is selected. For LTE TDD, the index means that the designated user transmits SRS in the first symbol (701) and the first normal uplink sub-frame (sub-frame 2) (702). For LTE FDD, the index is reserved by the system and the system doesn't use the index to transmit SRS information of designated user. Then, after the transmission channel mapping and physical channel mapping, the system transmit s the index information to the designated user.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting an uplink Sounding Reference Signal (SRS) by a User Equipment (UE), the method comprising steps of:
   receiving information related to an SRS period and an offset for an SRS transmission;
   generating the uplink SRS; and
      when the information indicates the SRS period is 2 ms, transmitting the SRS in two Single Carrier Frequency Division Multiple Access (SCFDMA) symbols in a half frame according to the offset for the SRS transmission,
   wherein, when the information indicates the SRS period is 2 ms and a length of an Uplink Pilot Time Slot (UpPTS) in the half frame is two symbols, a first symbol in the UpPTS is indicated by offset 0 and a second symbol in the UpPTS is indicated by offset 1.

2. The method of claim 1, wherein offsets 2, 3 and 4 indicate a symbol in 2nd, 3rd and 4th subframes, respectively.

3. The method of claim 2, wherein the information related to the SRS period for the SRS transmission comprises an index indicating the SRS period for the SRS transmission and the offset for the SRS transmission, and wherein the index and the offset for the SRS transmission are defined by:

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

4. The method of claim 3, further comprising:
   when the information indicates the SRS period is not 2 ms, transmitting the SRS with the SRS period and the offset indicated by the information.

5. A User Equipment (UE) for transmitting an uplink Sounding Reference Signal (SRS) in a communication system, the UE comprising:
   a receiver module for receiving information related to an SRS period and an offset for SRS transmission;
   an SRS sequence generator for generating the uplink SRS; and
   a sequence transmission controller for transmitting the SRS in two Single Carrier Frequency Division Multiple Access (SCFDMA) symbols in a half frame according to the offset for SRS transmission, when the information indicates the SRS period is 2 ms,
   wherein, when the information indicates the SRS period is 2 ms and a length of an Uplink Pilot Time Slot (UpPTS) in the half frame is two symbols, a first symbol in the UpPTS is indicated by offset 0 and a second symbol in the UpPTS is indicated by offset 1.

6. The UE of claim 5, wherein offsets 2, 3 and 4 indicate a symbol in 2nd, 3rd and 4th subframes, respectively.

7. The UE of claim 6, wherein the information related to the SRS period for the SRS transmission comprises an index indicating the SRS period for the SRS transmission and the offset for the SRS transmission, and wherein the index and the offset for the SRS transmission are defined by:

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

8. The UE of claim 7, wherein the sequence transmission controller transmits the SRS with the SRS period and the offset indicated by the information, when the information indicates the SRS period is not 2 ms.

9. A method for receiving an uplink Sounding Reference Signal (SRS) by a Base Station (BS) in a communication system, the method comprising the steps of:
   transmitting information related to an SRS period and an offset for SRS transmission to a User Equipment (UE); and
   when the information indicates the SRS period is 2 ms, receiving the uplink SRS in two Single Carrier Frequency Division Multiple Access (SCFDMA) symbols in a half frame according to the offset for SRS transmission from the UE,
   wherein, when the information indicates the SRS period is 2 ms and a length of an Uplink Pilot Time Slot (UpPTS) in the half frame is two symbols, a first symbol in the UpPTS is indicated by offset 0 and a second symbol in the UpPTS is indicated by offset 1.

10. The method of claim 9, wherein offsets 2, 3 and 4 indicate a symbol in 2nd, 3rd and 4th subframes, respectively.

11. The method of claim 10, wherein the information related to the SRS period for the SRS transmission comprises an index indicating the SRS period for the SRS transmission and the offset for the SRS transmission, and wherein the index and the offset for the SRS transmission are defined by:

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

12. The method of claim 11, further comprising:
when the information indicates the SRS period is not 2 ms, receiving the SRS with the SRS period and the offset indicated by the information from the UE.

13. A Base Station (BS) for receiving an uplink Sounding Reference Signal (SRS) in a communication system, the BS comprising:
a transmitter module for transmitting information related to an SRS period and an offset for SRS transmission to a User Equipment (UE); and
a receiver module for receiving the SRS in two Single Carrier Frequency Division Multiple Access (SCFDMA) symbols in a half frame according to the offset for SRS transmission, when the information indicates the SRS period is 2 ms,
wherein, when the information indicates the SRS period is 2 ms and a length of an Uplink Pilot Time Slot (UpPTS) in the half frame is two symbols, a first symbol in the UpPTS is indicated by offset 0 and a second symbol in the UpPTS is indicated by offset 1.

14. The BS of claim 13, wherein offsets 2, 3 and 4 indicate a symbol in 2nd, 3rd and 4th subframes, respectively.

15. The BS of claim 14, wherein the information related to the SRS period for the SRS transmission comprises an index indicating the SRS period for the SRS transmission and the offset for the SRS transmission, and wherein the index and the offset for the SRS transmission are defined by:

| Index | Offset |
|-------|--------|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

16. The BS of claim 15, wherein the receiver module receives the SRS with the SRS period and the offset indicated by the information, when the information indicates the SRS period is not 2 ms.

* * * * *

UNITED STATES PATENT AND TRADEMARK OFFICE
CERTIFICATE OF CORRECTION

| | | |
|---|---|---|
| PATENT NO. | : 8,520,492 B2 | Page 1 of 1 |
| APPLICATION NO. | : 12/865334 | |
| DATED | : August 27, 2013 | |
| INVENTOR(S) | : Li et al. | |

It is certified that error appears in the above-identified patent and that said Letters Patent is hereby corrected as shown below:

On the Title Page, Item (30) Foreign Application Priority Data:

"2008 1 004863" should be -- 2008 1 0004863.0 --

Signed and Sealed this
Fourth Day of February, 2014

Michelle K. Lee
*Deputy Director of the United States Patent and Trademark Office*